(12) United States Patent
Cai et al.

(10) Patent No.: US 12,384,045 B2
(45) Date of Patent: Aug. 12, 2025

(54) SUPPLEMENTAL AND TARGETED HEATING OF VEHICLE BODY-IN-WHITE INTERIOR COMPONENTS/AREAS FOR PAINT OVENS

(71) Applicant: GM GLOBAL TECHNOLOGY OPERATIONS LLC, Detroit, MI (US)

(72) Inventors: Wayne Cai, Troy, MI (US); Hua-Tzu Fan, Troy, MI (US); Blair E. Carlson, Ann Arbor, MI (US); Jennifer Therese Bracey, Holly, MI (US); Mark E. Baylis, Howell, MI (US); Kenneth W. McLean, Commerce Township, MI (US); Matthew Bondy, Windsor (CA); Ian McLoughlin, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 519 days.

(21) Appl. No.: 17/832,914

(22) Filed: Jun. 6, 2022

(65) Prior Publication Data

US 2023/0390938 A1 Dec. 7, 2023

(51) Int. Cl.
*B25J 11/00* (2006.01)
*B62D 65/00* (2006.01)
*H05B 6/10* (2006.01)

(52) U.S. Cl.
CPC ........... *B25J 11/0075* (2013.01); *B62D 65/00* (2013.01); *H05B 6/10* (2013.01)

(58) Field of Classification Search
CPC ....... B25J 11/0075; B25J 11/00; B62D 65/00; B62D 25/04; H05B 6/10; H05B 2203/032; H05B 6/101; H05B 1/023
See application file for complete search history.

(56) References Cited

U.S. PATENT DOCUMENTS

| | | | |
|---|---|---|---|
| 5,115,758 A | * | 5/1992 | Suzuki ................... B05D 1/002 118/621 |
| 8,287,966 B2 | | 10/2012 | Sundarraj et al. |
| 8,317,253 B2 | | 11/2012 | Sachdev et al. |
| 8,327,910 B2 | | 12/2012 | Walker et al. |
| 8,361,251 B2 | | 1/2013 | Luo et al. |
| 8,454,078 B2 | | 6/2013 | Sachdev et al. |
| 8,708,425 B2 | | 4/2014 | Carlson et al. |
| 8,852,359 B2 | | 10/2014 | Walker et al. |
| 8,889,226 B2 | | 11/2014 | Walker et al. |

(Continued)

OTHER PUBLICATIONS

U.S. Appl. No. 17/323,041, filed May 18, 2021, Bobel et al.

(Continued)

*Primary Examiner* — Lee A Holly (57) ABSTRACT

A heating system includes a conveying system configured to transport a plurality of vehicle body-in-whites (BIWs) sequentially through an oven room to cure paint applied in a paint room. A preheating system includes one or more robot arms. A heat source is connected to the one or more robot arms. A controller is configured to control the one or more robot arms based on a position of one of the vehicle BIWs on the conveying system and to position the heat source near or in direct contact with one or more inner components of the one of the vehicle BIWs to heat the one or more inner components prior to the one of the vehicle BIWs entering the oven room.

10 Claims, 7 Drawing Sheets

(56) References Cited

U.S. PATENT DOCUMENTS

| | | |
|---|---|---|
| 8,992,696 B2 | 3/2015 | Walker et al. |
| 9,358,608 B2 | 6/2016 | Carlson et al. |
| 9,555,694 B2 | 1/2017 | O'Kane et al. |
| 9,771,635 B2 | 9/2017 | Wang et al. |
| 11,359,269 B2 | 6/2022 | Morales et al. |
| 2003/0121906 A1* | 7/2003 | Abbott .................... H05B 3/12 219/543 |
| 2008/0099040 A1* | 5/2008 | Bahng ............... H01L 21/02057 134/21 |
| 2010/0227082 A1* | 9/2010 | Fan ...................... B05D 3/0263 427/532 |
| 2011/0286880 A1 | 11/2011 | Luo et al. |
| 2019/0136401 A1* | 5/2019 | Maddela ................ C25D 13/02 |
| 2021/0046643 A1* | 2/2021 | Kegasa .................. B25J 9/1666 |
| 2022/0039278 A1 | 2/2022 | Golm et al. |
| 2023/0060932 A1* | 3/2023 | Willden ............. B29D 99/0003 |

OTHER PUBLICATIONS

U.S. Appl. No. 17/388,799, filed Jul. 29, 2021, Bobel et al.
U.S. Appl. No. 17/500,641, filed Oct. 13, 2021, Bobel et al.
U.S. Appl. No. 17/679,254, filed Feb. 24, 2022, Sachdev et al.
U.S. Appl. No. 17/735,228, filed May 3, 2022, Morales et al.

* cited by examiner

SUPPLEMENTAL AND TARGETED HEATING OF VEHICLE BODY-IN-WHITE INTERIOR COMPONENTS/AREAS FOR PAINT OVENS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to painting of vehicles, and more particularly to supplemental and targeted heating of vehicle components during curing of a vehicle body-in-white (BIW) after painting.

During manufacturing, a vehicle body-in-white (BIW) is typically painted prior to assembly of other vehicle components such as powertrain, suspension, doors, interior, etc. After painting in a paint shop, the vehicle BIW passes through an oven to cure the paint and/or other structural adhesives that are used. During heating in the oven, outer panels of the vehicle BIW heat up much faster than inner panels of the vehicle BIW since the outer panels are directly exposed to a heat source of the oven. In other words, the outer panels shield the inner panels from the heat source. The temperature difference induces thermal stress and may cause outer panels to buckle as the vehicle BIW passes through the oven.

SUMMARY

A heating system includes a conveying system configured to transport a plurality of vehicle body-in-whites (BIWs) sequentially through an oven room to cure paint applied in a paint room. A preheating system includes one or more robot arms. A heat source is connected to the one or more robot arms. A controller is configured to control the one or more robot arms based on a position of one of the vehicle BIWs on the conveying system and to position the heat source near or in direct contact with one or more inner components of the one of the vehicle BIWs to heat the one or more inner components prior to the one of the vehicle BIWs entering the oven room.

In other features, the heat source comprises a contact heat source. The contact heat source comprises a resistive heater. The contact heat source comprises an array of resistive heaters. The heat source comprises a non-contact heat source. The non-contact heat source includes an inductive heater including a coil. The non-contact heat source includes an inductive heater including an array of coils. The non-contact heat source includes an infrared heater. The non-contact heat source includes a heated air source.

In other features, the controller is configured to position the heat source while the one of the vehicle BIWs is moved by the conveying system.

A heating system includes a conveying system configured to transport a plurality of vehicle body-in-whites (BIWs) sequentially through a paint room and an oven room to cure paint applied in the paint room. A supplemental heating system is arranged inside of the oven room and includes a heat source, a controller, and one or more arms connected to the heat source and configured to extend into one of the vehicle BIWs to heat one or more interior components of the one of the vehicle BIWs to reduce a temperature differential relative to an outer surface of the one of the vehicle BIWs while the one of the vehicle BIWs passes through the oven room.

In other features, the heat source comprises a non-contact heat source. The non-contact heat source includes an infrared heater. A mirror connected to at least one of the one or more arms to divert a portion of infrared light output by the infrared heater onto the one or more interior components.

In other features, the non-contact heat source includes a heated air source and wherein the one or more arms include internal fluid channels configured to direct heater air onto the one or more interior components of the one of the vehicle BIWs. A diffuser is connected to at least one of the one or more arms to divert a portion of heated air from the heated air source.

In other features, the one or more arms include a first arm, a second arm movably connected to the first arm, and an actuator configured to extend the second arm into an interior of the one of the vehicle BIWs to direct the heat source at the one or more interior components of the one of the vehicle BIWs.

In other features, the one or more arms further include a third arm that rotates relative to the second arm. A first fluid channel in the first arm, a second fluid channel in the second arm and a third fluid channel in the third arm, wherein the first fluid channel is in fluid communication with a source of heated air, the second fluid channel, and the third fluid channel.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure relates preheating or supplemental heating of inner components/areas of a vehicle BIW to prevent thermal-induced distortion of outer panels of the vehicle BIW during curing in the oven. As described above, the vehicle body-in-white (BIW) is typically painted in a paint shop prior to assembly of other vehicle components. After being painted in the paint shop, the vehicle BIW passes through the oven to cure the wet paint and/or other structural adhesives that are used.

During heating in the oven, vehicle outer panels heat up much faster than vehicle inner panels since the outer panels are directly exposed to a heat source of the oven. In other words, the outer panels may shield the inner panels from the heat source. The temperature difference induces thermal stress and may cause outer panels to buckle as the vehicle BIW passes through the oven.

Figure 1A:
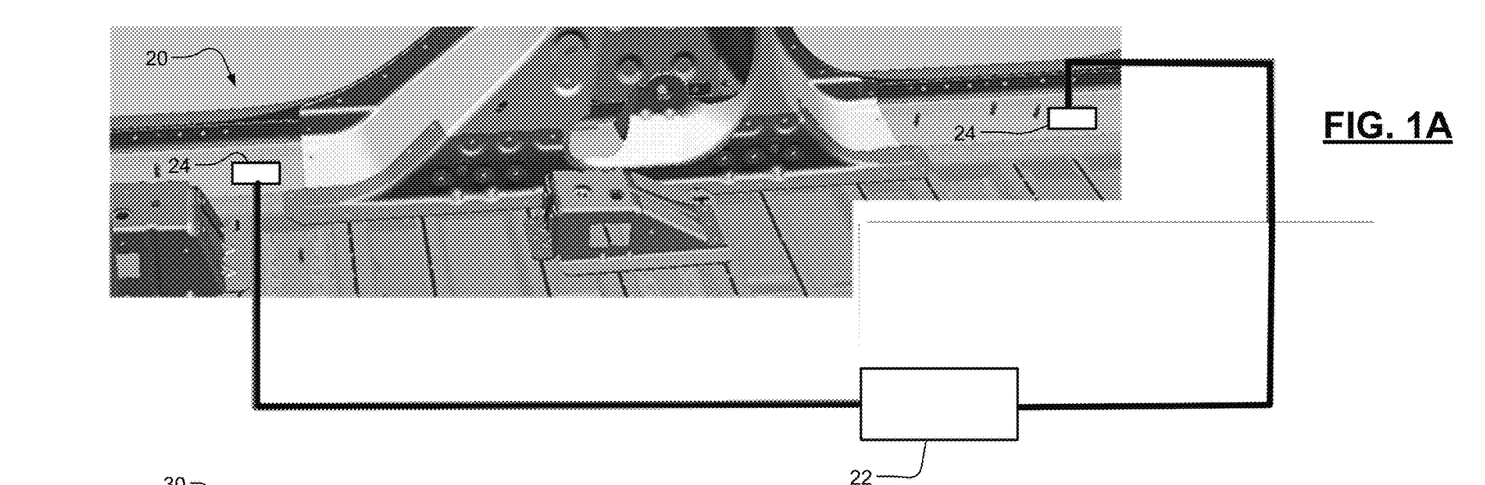
FIG. 1A is a functional block diagram of an example of a contact heater configured to preheat a component of a vehicle BIW prior passing through to the oven according to the present disclosure.
Figure 1B:
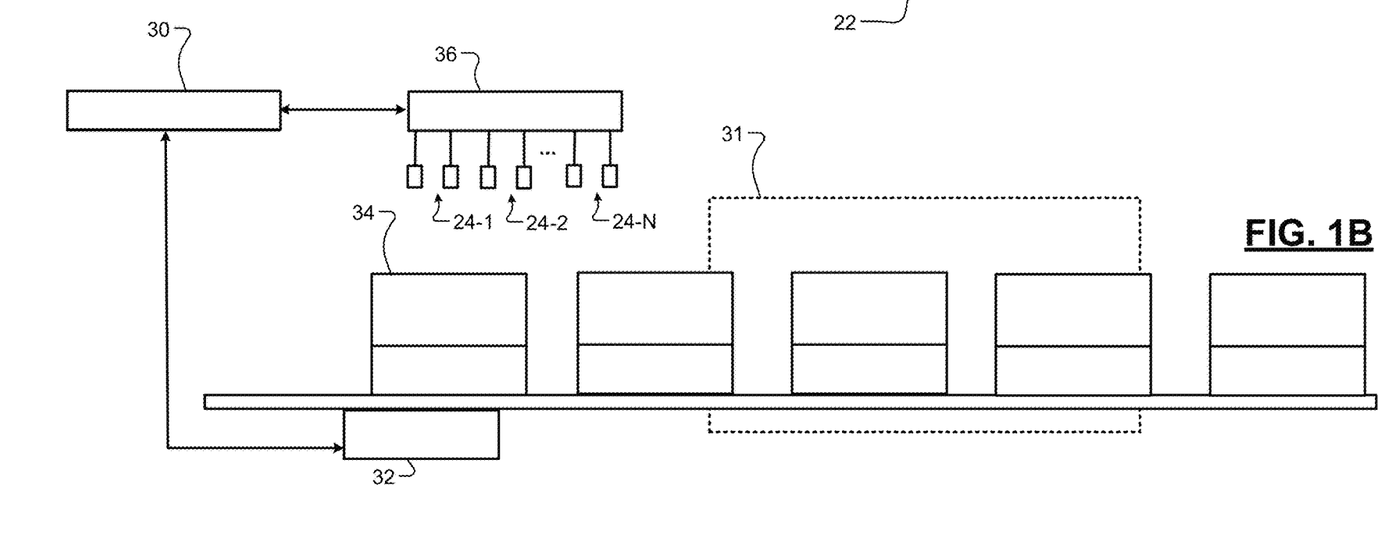
FIG. 1B is a functional block diagram of an example of a robot for positioning the contact heater relative to the vehicle BIW prior passing through to the oven according to the present disclosure.

Referring now to FIGS. 1A and 1B, systems and methods are shown for preheating selected portions of the vehicle BIW before the vehicle BIW enters the oven using contact heating to reduce heat distortion. In some examples, the contact heating includes resistive heating.

In FIG. 1A, a portion 20 of a vehicle BIW is shown. Leads 24 and 28 from a resistive heater 22 are connected inner components/areas of the vehicle BIW and current is supplied between the leads 24 for a predetermined period. The path between the leads 24 has a non-zero resistance and the current flowing between the leads 24 heats the inner components/areas there between.

In FIG. 1B, a conveying system 32 propels vehicle BIWs 34 through a paint room (not shown) and then through an oven 31 for curing of the paint and/or structural adhesives. A robot includes one or more robot arms 36 that positions N pairs of leads 24-1, 24-2, . . . , and 24-N of the resistive heater 22 adjacent to the inner component/area of the vehicle BIW 34 to be preheated. As can be appreciated, a single robot arm can position a pair of leads, two or more separately controlled robots can position two or more leads, respectively, a single robot arm can position a fixture including multiple leads, and/or combinations thereof.

A controller 30 is configured to coordinate movement of the one or more robot arms 36 (into position in the vehicle BIW and application of the current through the leads 24) relative to the vehicle BIWs on the conveying system 32. In other words, as the vehicle BIW 34 is moved on a conveying system, the one or more robot arms 36 extend into the vehicle BIW, position the leads 24 in contact with the vehicle BIW while it is moving, apply current for heating, and then retract. The process is repeated for the next vehicle BIW on the conveying system.

Resistive heating is the most direct and efficient method of heating targeted workpieces, even if the workpieces are encapsulated. Resistive heating is highly efficient since only a few seconds of heating is needed. Little or no extra workspace is needed.

Figure 2A:
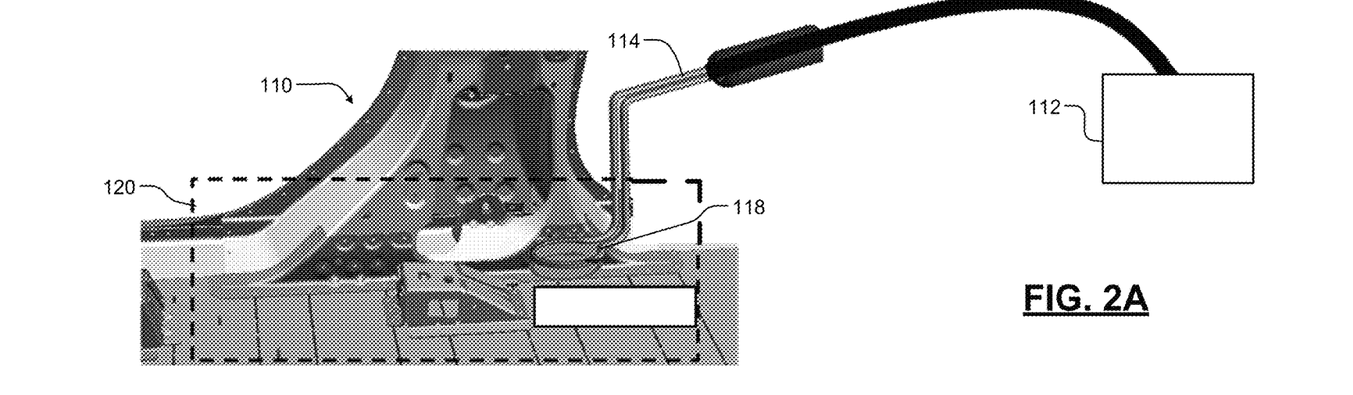
FIG. 2A is a functional block diagram of an example of a non-contact heater configured to preheat a component of a vehicle BIW prior passing through to the oven according to the present disclosure.
Figure 2B:
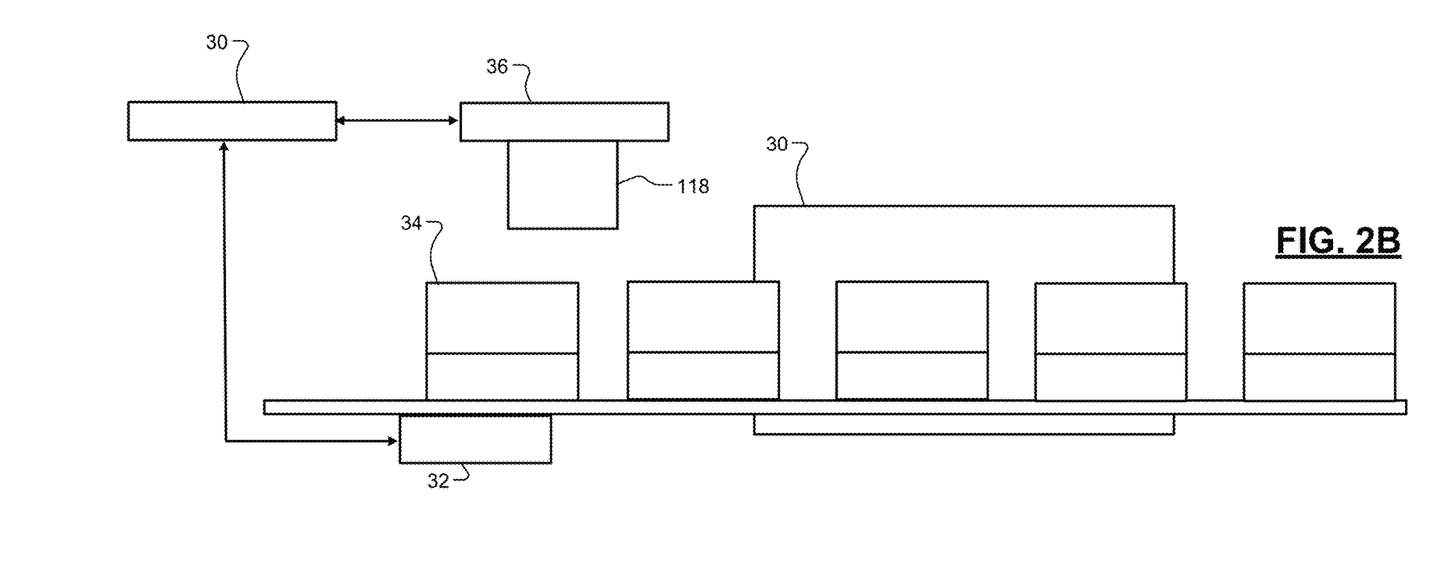
FIG. 2B is a functional block diagram of an example of a robot for positioning the non-contact heater relative to the vehicle BIW prior passing through to the oven according to the present disclosure.

Referring now to FIGS. 2A and 2B, a method for reducing heat distortion includes preheating selected portions of the vehicle BIW prior to heating in the oven using non-contact heating. While the foregoing example includes inductive heating. convective heating using hot air and/or infrared heating can also be used. In FIG. 2A, an inductive heater 111 includes a controller and power supply 112 and a conductor 114 with one or more coils 118. The controller and power supply 112 outputs power through the one or more coils 118 that are arranged adjacent to a desired area on a body inner structure to be preheated. The one or more coils 118 generate a magnetic field that induces eddy currents in the vehicle BIW to cause heating of the selected portions of the vehicle BIW.

In some examples, the one or more coils 118 include a single coil that heats a single portion of the vehicle BIW and/or is sequentially moved to multiple portions of the vehicle BIW. This arrangement is low-cost, relatively flexible, and supports low throughput. In some examples, the one or more coils 118 include an array of coils that are arranged by a fixture in one or more predetermined patterns corresponding one or more portions located inside of the vehicle BIW. In other examples, the one or more coils are arranged adjacent to different portions of the body inner structure to allow multiple components to be heated at the same time prior to entering the oven. This arrangement has a higher cost, is less flexible, and supports higher throughput.

In FIG. 2B, the conveying system 32 carries the vehicle BIW 34 into the oven 31. One or more robot arms 36 position one or more coils of the inductive heater 111 relative to the selected portion of the vehicle BIW 34 to be heated. In other words, as the vehicle BIW 34 is moved on a conveying system, the one or more robot arms 36 extend into the vehicle BIW, position the one or more coils 118 in contact with the vehicle BIW while it is moving, apply current for heating, and then retract. The process is repeated for the next vehicle BIW on the conveying system.

Figure 3A:
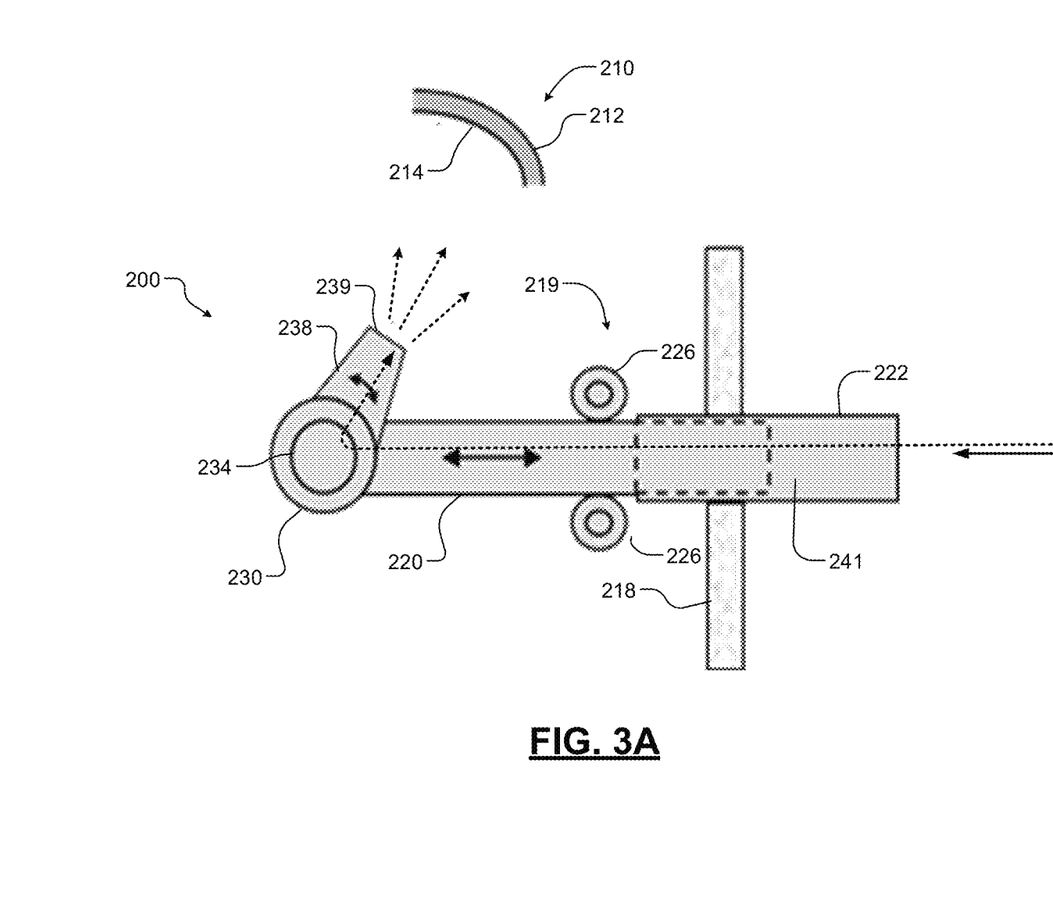
FIGS. 3A and 3B are drawings illustrating an example of a supplemental heating system arranged in the oven to direct hot air at an inner surface of a vehicle BIW according to the present disclosure.
Figure 3B:
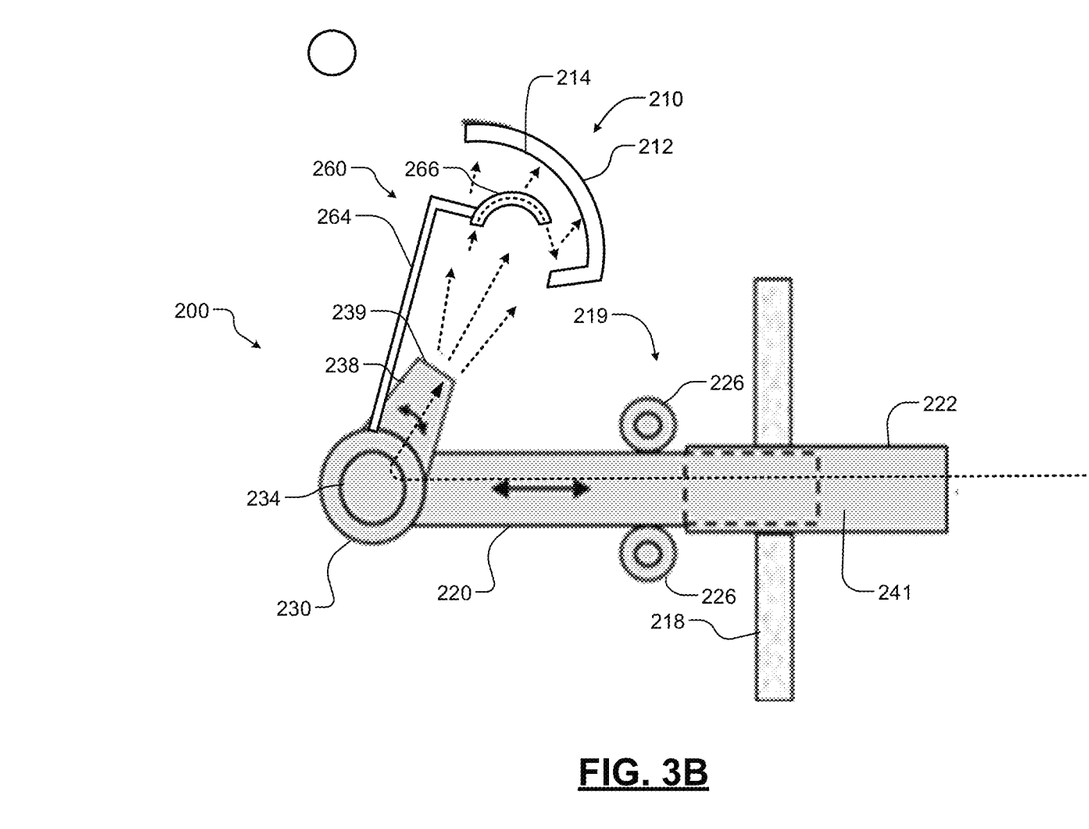

Referring now to FIGS. 3A and 3B, a preheating system 200 is used to heat an inner surface 214 of a portion 210 of a vehicle BIW located inside of the oven using supplemental heating such as heated air. The outer surface 212 of the vehicle BIW is primarily heated by the oven. The preheating system 200 is mounted inside of the oven (such as on an oven wall 218) and includes a position adjuster 219. In some examples, the position adjuster 219 includes an extendable arm 220 slidably received by a mounted arm 222. In some examples, rollers 226 guide the extendable arm 220. In some examples, the rollers 226 are rotated by a motor (not shown) to controllably move the extendable arm 220 inwardly and outwardly. In other examples, a linear actuator (not shown) such as cylinder or screw motor is used.

An arm 238 is connected to an end of the extendable arm 220. In some examples, the arm 238 is fixed relative to the extendible arm 220 and in other examples the arm rotates relative to an axis 234. In some examples, a positioning motor 230 adjusts an angular position of the arm 238 relative to the extendable arm 220. Heated air is supplied through fluid channels arranged inside of or outside of the mounted arm 222, the extendable arm 220, the arm 238 and an outlet 239 onto an inner surface of the vehicle BIW to be heated.

In some examples, the heated air that is supplied is already generated by the oven and redirected. The heated air is supplied to a region behind the oven wall 218 of the oven and flows through fluid channels 241 in the mounted arm 222, the extendable arm 220, the arm 238 and the outlet 239 onto the inner surface of the vehicle BIW to be heated.

In FIG. 3B, a diffuser 260 can be used to redirect the hot air supplied from the outlet 239. In some examples, the diffuser 260 is spaced from the outlet and connected by a supporting member 264 to the arm 238 and/or the extendable arm 220. In some examples, a diffuser surface 266 is spaced from the outlet 239 and is used to redirect the heated air onto another portion of the vehicle BIW. The diffuser 260 can be used for more complex inner components/areas that may be oriented in a direction that is difficult to reach using the heater air directly from the outlet 239. In some examples, the diffuser surface 266 can include an enclosed surface with open ends such as a curved tube or an open surface such as a shaped surface.

Figure 4A:
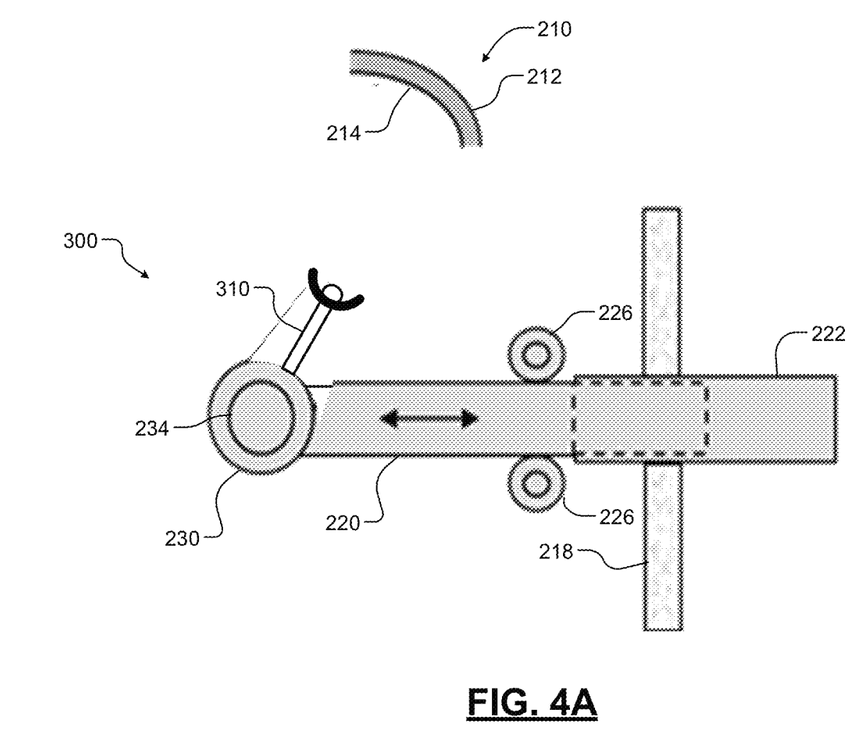
FIGS. 4A and 4B are drawings illustrating an example of a supplemental heating system deployed in the oven to direct infrared light at an inner surface of a vehicle BIW according to the present disclosure.
Figure 4B:
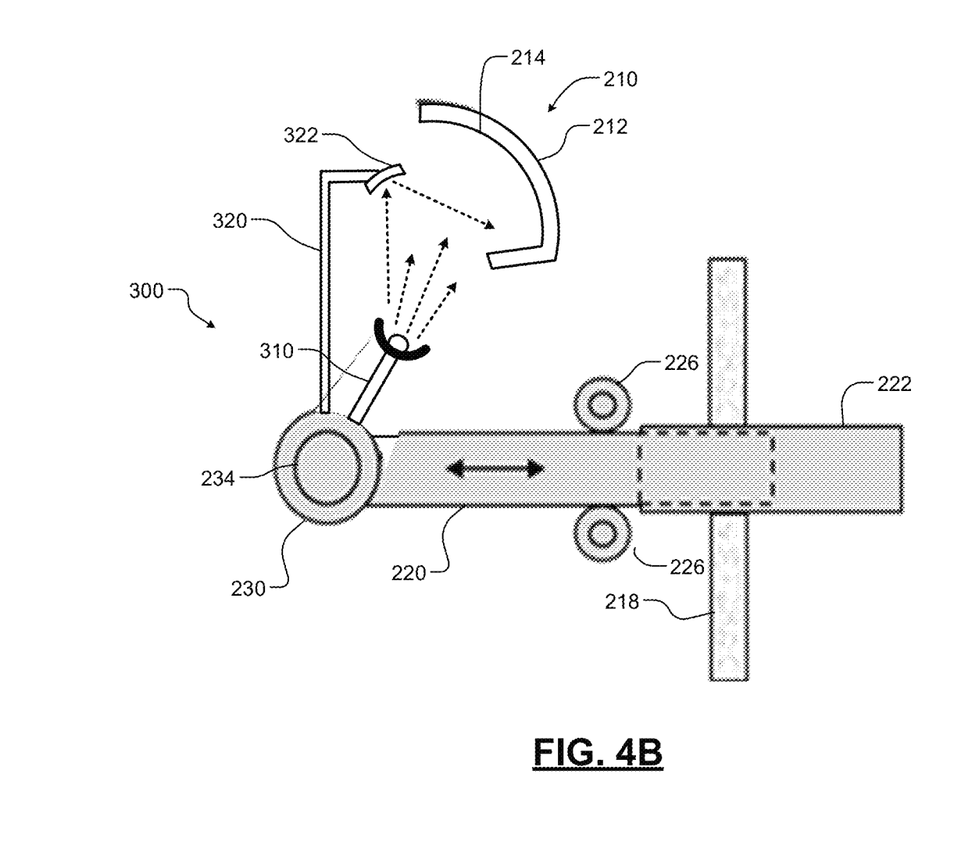

Referring now to FIGS. 4A and 4B, a preheating system 300 is used to preheat an inner surface 214 of the portion 210 of a vehicle BIW using an infrared heating. The outer surface 212 is primarily heated by the oven. The preheating system 300 is mounted to the oven wall 218 and includes the position adjuster 219. An infrared lamp 310 is connected to an end of the extendable arm 220. The infrared lamp 310 is fixed to the extendable arm 220 or rotates relative to the extendable arm 220 about the axis 234. In some examples, the positioning motor 230 adjusts the angular position of the infrared lamp 310 relative to the extendable arm 220. The infrared lamp 310 is directed at the portion of the vehicle BIW to be heated.

In FIG. 4B, a mirror 322 or other reflective surface can be used to redirect the infrared light from the infrared lamp 310 to heat more complex inner components/areas that may be oriented in a direction that is difficult to reach using the infrared radiation directly from the infrared lamp 310. In some examples, the mirror 322 is connected by a supporting member 320 to the arm 238 and/or the extendable arm 220.

Figure 5:
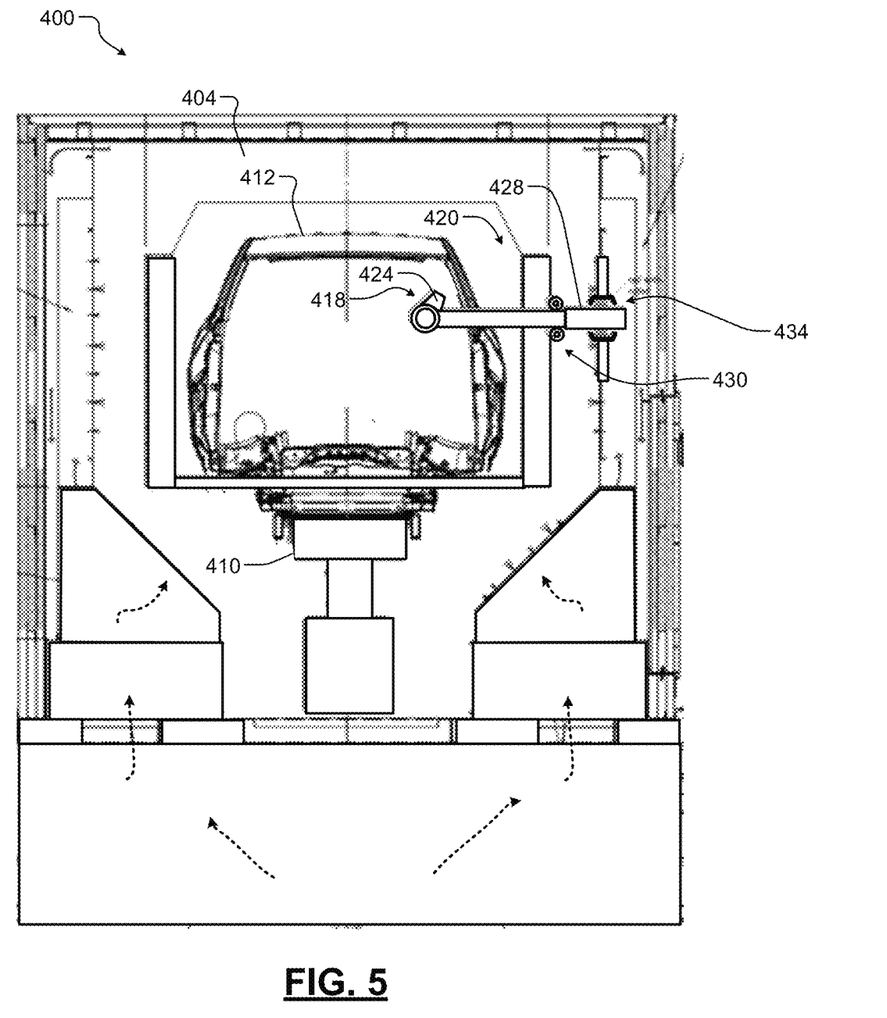
FIG. 5 illustrates the heating system installed inside of the oven according to the present disclosure.

Referring now to FIG. 5, the vehicle BIWs move through an inner volume 404 of the oven 400 on a conveying system 410 and are heated by the oven to cure the paint and/or bonding adhesives. The conveying system 410 transports a vehicle BIW 412 through the inner volume 404 of the oven 400. A supplemental heating system 418 includes a positioning system 420 that adjusts a position of a source of heat 424 relative to the vehicle BIW 412 that is moving. In some examples, the positioning system 420 includes a first positioner 430 that moves the output of the supplemental heater laterally into the volume and a second positioner 434 that moves the supplemental heater in a longitudinal direction parallel to the movement of the vehicle BIW on the conveying system 410 so that the supplement heating system 418 is moving in synchronization with the vehicle BIW 412.

Figure 6:
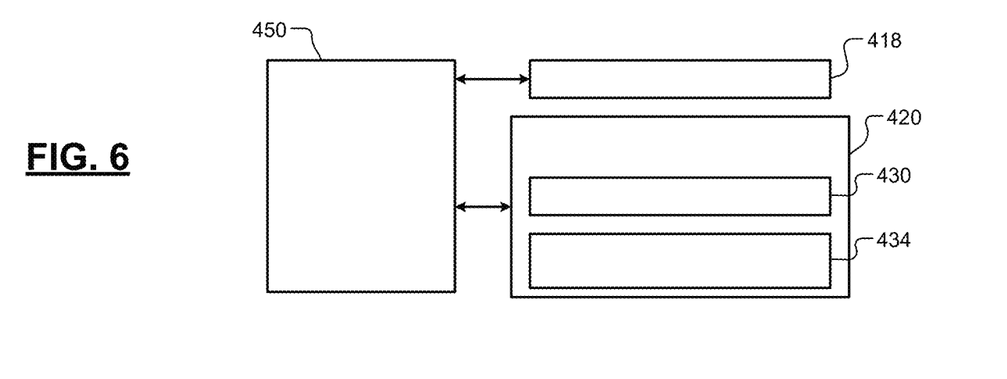
FIG. 6 is a functional block diagram of an example of a control system for the supplemental heating systems in FIGS. 3A to 5 according to the present disclosure.

Referring now to FIG. 6, a controller 450 coordinates movement of the vehicle BIW relative to the supplemental heating system. The controller 450 coordinates movement relative to the position of the vehicle BIW and the inner components/areas thereof that need to be heated. The controller 450 determines the desired position of the supplemental heater relative to the vehicle BIW and controls the positioning system 420 in response thereto.

In some examples, the positioning system 420 includes a first positioner 430 configured to extend and retract the arm. In some examples, the first positioner 430 includes rollers with motors configured to rotate in first and second directions to extend or retract the arm. In other examples, the first positioner 430 includes a cylinder that extends and retracts to the arm using fluid such as liquid or gas, a screw motor or other linear actuator.

A second positioner 434 is configured to move the supplemental heating system longitudinally approximately in sync with the vehicle BIW on the conveying system while supplement heating is performed. After performing supplemental heating, the first positioner 430 retracts the arm and the second positioner 434 moves the supplemental heating system in a direction opposite to the conveying direction to align with the next vehicle BIW. When positioned relative to the next vehicle BIW, the first positioner 430 extends the arm and the second positioner 434 moves approximately in sync with the conveying system while supplemental heating is performed again.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A heating system, comprising:
a conveying system configured to transport a plurality of vehicle body-in-whites (BIWs) sequentially through a paint room and an oven room to cure paint applied in the paint room;
a supplemental heating system arranged inside of the oven room and including:
a heat source;
a controller; and
one or more arms connected to the heat source and configured to extend into one of the vehicle BIWs to heat one or more interior components of the one of the vehicle BIWs to reduce a temperature differential relative to an outer surface of the one of the vehicle BIWs while the one of the vehicle BIWs passes through the oven room.

2. The heating system of claim 1, wherein the one or more arms includes:
a first arm;
a second arm movably connected to the first arm; and
an actuator configured to extend the second arm into an interior of the one of the vehicle BIWs to direct the heat source at the one or more interior components of the one of the vehicle BIWs.

3. The heating system of claim 2, wherein the one or more arms further include a third arm that rotates relative to the second arm.

4. The heating system of claim 3, further comprising a first fluid channel in the first arm, a second fluid channel in the second arm and a third fluid channel in the third arm.

5. The heating system of claim 4, wherein the first fluid channel is in fluid communication with a source of heated air, the second fluid channel, and the third fluid channel.

6. The heating system of claim 1, wherein the heat source comprises a non-contact heat source.

7. The heating system of claim 6, wherein the non-contact heat source includes an infrared heater.

8. The heating system of claim 7, further comprising a mirror connected to at least one of the one or more arms to divert a portion of infrared light output by the infrared heater onto the one or more interior components.

9. The heating system of claim 6, wherein the non-contact heat source includes a heated air source and wherein the one or more arms include internal fluid channels configured to direct heater air onto the one or more interior components of the one of the vehicle BIWs.

10. The heating system of claim 9, further comprising a diffuser connected to at least one of the one or more arms to divert a portion of heated air from the heated air source.

* * * * *